United States Patent [19]

Escobal

[11] Patent Number: 5,054,423
[45] Date of Patent: Oct. 8, 1991

[54] APPARATUS FOR AIR DELIVERY SYSTEM

[76] Inventor: Peter Escobal, P.O. Box 2457, Oxnard, Calif. 93033

[21] Appl. No.: 491,305

[22] Filed: Mar. 9, 1990

[51] Int. Cl.$^5$ .......................... A01K 63/04; A62B 7/02
[52] U.S. Cl. ............................................ 119/5; 261/77; 261/121.1; 128/204.25
[58] Field of Search ...................... 261/64.4, 77, 121.1; 128/200.11, 204.25; 119/3, 5; 55/226, 247, 256

[56] References Cited

U.S. PATENT DOCUMENTS

| | | |
|---|---|---|
| 2,086,778 | 7/1937 | Peffer et al. ............................ 23/221 |
| 3,124,131 | 3/1964 | Gross .................................. 55/256 X |
| 3,555,783 | 1/1971 | Grimshaw ................................ 55/48 |
| 3,643,403 | 2/1972 | Speece .................................... 55/53 |
| 3,904,393 | 9/1975 | Morse .................................... 55/228 |
| 4,043,771 | 8/1977 | Anand ..................................... 55/93 |
| 4,045,336 | 8/1977 | Isteri .................................... 210/15 |
| 4,072,612 | 2/1978 | Daniel .................................. 210/169 |
| 4,100,071 | 7/1978 | Beurer et al. .......................... 210/197 |
| 4,101,607 | 7/1978 | Bart ..................................... 261/36 |
| 4,192,833 | 3/1980 | Hashimoto et al. ..................... 261/36 |
| 4,226,719 | 10/1980 | Woltman ............................. 261/77 X |
| 4,300,919 | 11/1981 | Lewis et al. ............................. 55/48 |
| 4,522,151 | 6/1985 | Arbisi et al. ......................... 119/5 X |
| 4,687,494 | 8/1987 | Escobal ................................... 55/37 |
| 4,911,836 | 3/1990 | Haggerty .......................... 261/77 X |
| 4,927,568 | 5/1990 | Campau .............................. 119/5 X |

Primary Examiner—Robert P. Swiatek
Attorney, Agent, or Firm—Poms, Smith, Lande & Rose

[57] ABSTRACT

An air delivery system introduces a selected amount of aspirated air into a stream of water conducted within a tube. The aspirated air being conducted in an air conducting tube has one end open to the atmosphere, the delivery system includes a flow system in the water tube which has a variable diameter throat and an axis, an outlet system for discharging air into the water stream in a variable spaced relation to the throat, a telescoping system for adjusting the spaced relation of telescopically related water conducting members and a connector between one end of the telescopically related members and the water tube. Movement of the telescopically related water conducting members relative to the throat varies the space between the throat and the air outlet system and accordingly varies the water flow area and the amount of aspirated air.

5 Claims, 2 Drawing Sheets

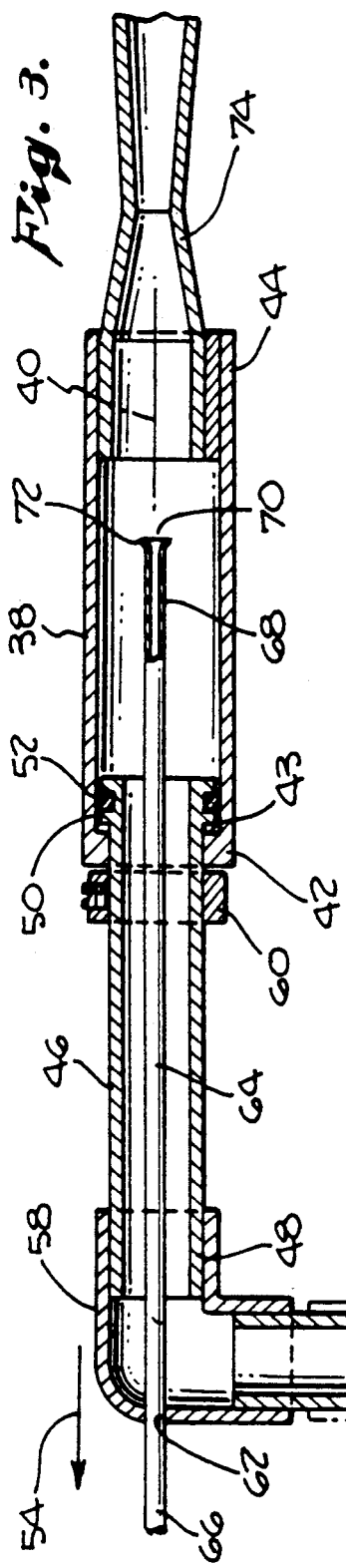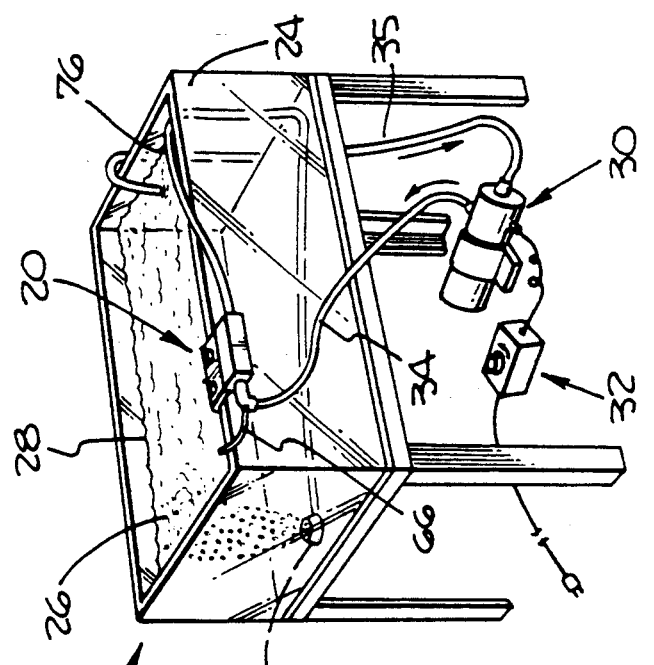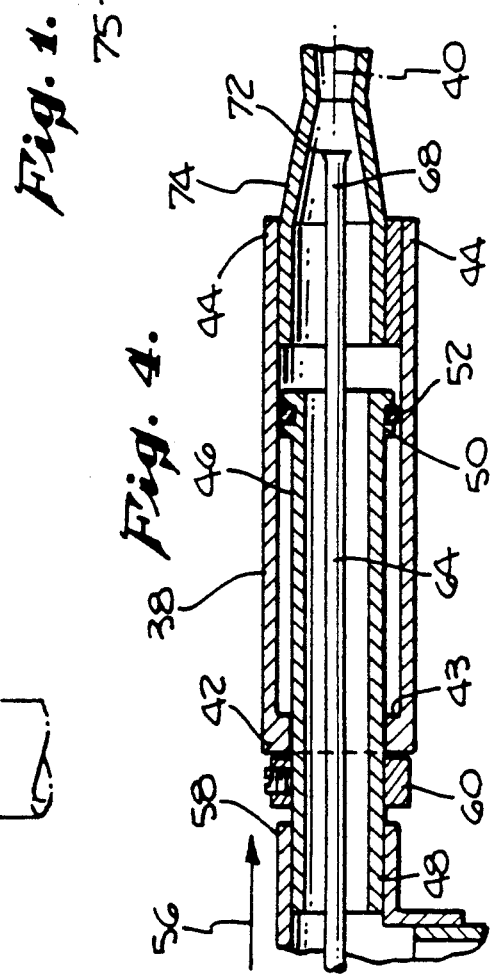

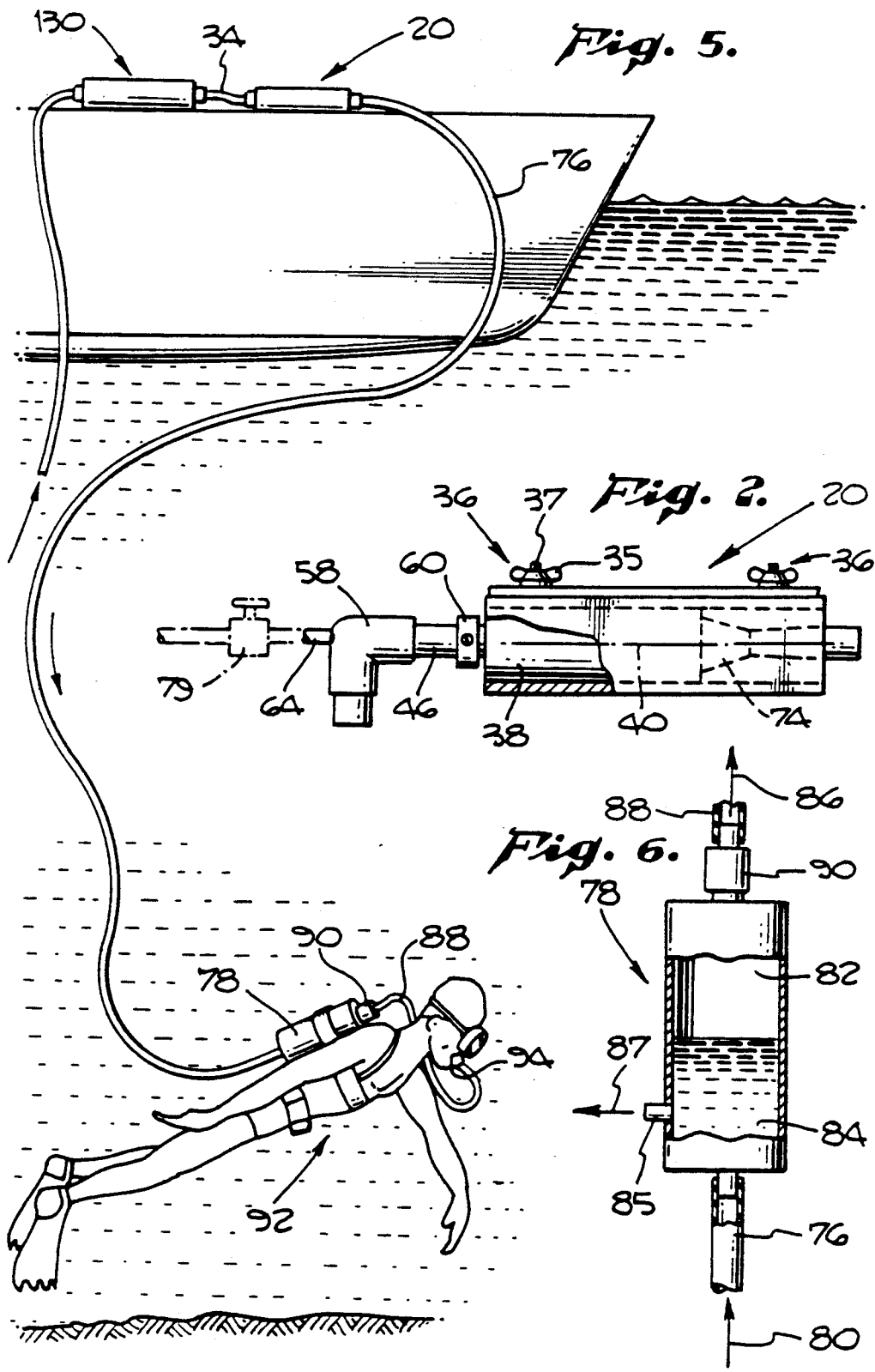

APPARATUS FOR AIR DELIVERY SYSTEM

FIELD OF THE INVENTION

This invention relates generally to air delivery systems, and more particularly to a novel apparatus and method for delivering an air-water mixture to a body of water in a container.

BACKGROUND OF THE INVENTION

In certain circumstances and applications, it is desirable to provide the introduction of an air-water mixture into a body of water. Aquariums, for example, in order to maintain marine life require the introduction of oxygen into the water. Similarly, underwater divers require the assistance of oxygen tanks or snorkels in order to provide sufficient oxygen to the diver to allow him to keep his face submerged for any length of time. While a certain level of oxygen may pre-exist in various aqueous environments or be generated by underwater plant life, it is frequently necessary to oxygenate the water environment to achieve the minimum oxygen level sufficient to sustain the desired life. Moreover, with respect to aquarium applications, it may also be desirable to provide aeration of aquariums in the form of bubble effects, lift tubes or air walls, for aesthetic purposes.

Most existing mechanical pumps for providing the oxygenation or aeration of water, e.g., diaphragm pumps, piston-type pumps and bellow-type pumps, have numerous, often intricate, moving parts. Cumbersome tanks or air lines connected to heavy generators are generally used to allow a diver to submerge for any significant length of time underwater. Often the air provided to divers by these methods is impure and contaminated by compressor oils. This air contamination problem also exists in many air delivery pumps in aquarium applications and other contained aquatic environments.

It is therefore an object of the present invention to provide novel apparatus and method of delivering an air-water mixture into a body of water where the air being introduced is relatively pure and uncontaminated by pollutants.

It is another object of the present invention to provide a novel apparatus and method of delivering an air-water mixture into a body of water wherein the novel apparatus and method has no moving parts, once it is set in place, that can break down or contaminate the air.

Yet another object of the present invention is to provide a novel apparatus and method for delivering an air-water mixture into a body of water where the air is provided from an ambient source.

Still another object of the present invention is to provide a novel apparatus and method for delivering an air-water mixture into a body of water in which both the velocity of the air-water mixture and the amount of air entering the body of water may be varied.

A more specific object of the present invention is to provide an adjustable air delivery means for introducing a selected amount of aspirated air into a stream of water conducted within a tube means, the aspirated air being conducted in an air conducting tube having one end open to the atmosphere, the delivery means includes a flow means in the water tube means having a variable diameter throat and an axis, an outlet means for discharging air into the water stream in a variable spaced relation to the throat, a telescoping means for adjusting the spaced relation of telescopically related water conducting members and a connector means between one end of the telescopically related members and the water tube means whereby movement of the telescopically related water conducting members relative to the throat varies the space between the throat and the air outlet means and accordingly varies the water flow area and the amount of aspirated air.

A further specific object of the invention is to provide an apparatus for delivering an air-water mixture to a body of water in a container and including a water pump and tube means for conducting water from the pump to the container and including an air delivery means having a cylindrical housing with a longitudinal axis, an elongated sleeve slidable engaged with the housing, a locking means for locking the sleeve in a selected location, an air conducting tube extending along the longitudinal axis to an air discharge port, a variable diameter throat means, whereby the amount of air introduced to said water may be varied by axis movement of the sleeve which, in turn, varies the distance between said throat and said air discharge port.

And another specific object of the prevent invention is to provide an apparatus for delivering a mixture of ambient air and water into an aquarium tank, when the air is introduced through an air conducting tube having an end located above the surface of the water in the tank.

Various other advantages and objects of the present invention will be readily apparent from the following description of the drawings in which an exemplary embodiment and alternative embodiment of the invention are described.

BRIEF DESCRIPTION OF THE DRAWINGS

FIG. 1 is a perspective view of an air delivery system in accordance with the present invention and connected to an aquarium tank, water pump and tube.

FIG. 2 is a side elevational view of the present invention.

FIG. 3 is an enlarged detailed view of the air delivery apparatus system shown in FIG. 2.

FIG. 4 is a fragmentary view similar to FIG. 3 but in a different position in relation to FIG. 3.

FIG. 5 is a pictorial view of an alternative embodiment of an air delivery system in accordance with the present invention for use by, and connected to, an underwater diver.

FIG. 6 is a partial cross-sectional detailed view of the alternative embodiment of the air delivery system container of FIG. 5.

DETAILED DESCRIPTION OF THE DRAWINGS

Preliminarily, to facilitate understanding of the present invention one of the environments into which it is applied should be briefly discussed. In FIG. 1, the apparatus embodying the present invention is generally indicated at 20 and is shown attached to an aquarium 22 at an aquarium wall 24. The aquarium 22 contains a body of water 26 capable of providing a suitable environment for tropical and marine life. As was discussed in the Background of the Invention, an aquarium often requires the oxygenation of the water in order to maintain certain marine life. In the preferred embodiment of the present invention, the apparatus 20 delivers an ambient air-water mixture into the body of water in the aquarium. If placement on the aquarium wall 24 is not desired, it should be understood that the apparatus 20 may be located anywhere near the tank so long as the apparatus 20 is positioned horizontally above the top of the water level 28 of the body of water 26. The apparatus 20 is connected to a power pump 30 which may be generated by an electronic power control, generally shown at 32. Pump 30 has a water tube means 34 from which water may be delivered to the apparatus 20. As is shown in FIG. 1 tube 35 allows water to flow from body of water 26 into pump 30 and is delivered up through tube means 34 and then into the apparatus 20.

Turning to address apparatus 20 in greater detail, FIG. 2 shows a side elevation of the apparatus 20. Apparatus 20 may be securely mounted in place by use of mounting means 36. As shown in FIGS. 1 and 2, mounting means 36 may be a locking wing nut 35 and bolt 37. It is contemplated that mounting means 36 may also be, without limitation, a magnetic device, a clamping mechanism or an adhesive device. As is discussed in greater detail immediately below in connection with FIGS. 3 and 4, water tube means 34 carries a stream of water into the apparatus 20.

FIG. 3 is an enlarged detailed view of the air delivery system shown in FIG. 2 and provides a basis for a more detailed explanation of the present invention. The apparatus 20 includes a cylindrical housing 38 having a longitudinal axis 40 (best shown in FIG. 2), a receiving end 42 and an outlet end 44. An elongated, open-ended hollow sleeve 46 having an intake end 48 and a seal end 50 is slidably engaged with the receiving end 42 of cylindrical housing 38. An important feature of the present invention is that hollow sleeve 46 may be slidably moved within cylindrical housing 38 along the longitudinal axis 40. Seal end 50 of hollow sleeve 46 includes an "O" ring seal 52. "O" ring seal 52 forms a water-tight seal between seal end 50 of hollow sleeve 46 and receiving end 42 of cylindrical housing 38. Hollow sleeve 46 moves axially along longitudinal axis 40. It should be apparent that hollow sleeve 46 and cylindrical housing 38 are telescopically related water conducting hollow members that can be slidably adjusted. The axial movement of hollow sleeve 46 is shown by directional arrows 54 and 56 (as shown in FIG. 4). The axial movement of hollow sleeve 46 is limited by stop lip 43 of cylindrical housing 38 in one direction; and in the other direction, axial movement is limited by a connector means 58 which is attached to intake end 48 of hollow sleeve 46. A locking means 60 is provided for locking the hollow sleeve 46 into a selected location within the cylindrical housing 38.

As shown in the preferred embodiment, connector means 58 is a 90° elbow and connects the intake end 48 of hollow sleeve 46 with tube means 34. Connector means 58 also includes surfaces defining an aperture 62 through which an air conducting tube 64 is carried. Air conducting tube 64 has an air intake end 66 (best shown in FIG. 1) and an air discharge end 68. Air conducting tube 64 is carried through connector means 58 to extend through hollow sleeve 46 along the longitudinal axis of the sleeve 46 and into the cylindrical housing 38. The air conducting tube 64 extends along the longitudinal axis 40 to an air discharge port 70. The discharge end 68 of air conducting tube 64 is shown in the preferred embodiment to have a flair configuration 72. Flair configuration 72 serves to disrupt the flow of water through cylindrical housing 38 and create a turbulence in air discharge port 70. The flow of water from water tube means 34 and through cylindrical housing 38 creates a force which draws ambient air through the air conducting tube 64 into the water flow at the air discharge port 70. This introduction of air into the water flow is discussed immediately below.

The accelerated flow of water through sleeve 46 and cylindrical housing 38 aspirates ambient air into the water stream. This ambient air is discharged from air conducting tube 64 into air discharge port 70. An air-water mixture is then provided that flows out of the outlet end 44 of cylindrical housing 38 through variable diameter throat 74. Because the air is introduced into the water flow by aspiration, the amount of air introduced is directly related to the velocity of water flow. The faster the velocity of the water passing through the cylindrical housing 38, the greater the suction or vacuum placed upon discharge end 68 of air conducting tube 64; in turn, the amount of aspirated ambient air introduced increases and the water pressure decreases. As shown in "phantom lines" in FIG. 2, the amount of ambient air may also be altered by a check valve 79, or other device that is capable of restricting airflow, located toward the air intake end 66 of air conducting tube 64.

Air conducting tube 64 is shown in FIG. 3 as being a straight, rigid member. It is contemplated that air conducting tube 64 may be constructed from a flexible rubber tube, or other flexible or semi-rigid material. It should be understood that it is the flow of water through hollow sleeve 46 and cylindrical housing 38 that supports air conducting tube 64. It is important that air intake end 66 of air conducting tube 64 be located above the surface of the water level 28 in tank 22. If air intake end 66 is submerged, then without other apertures, air conducting tube 64 cannot be used to introduce ambient air into the flow of water. Air conducting tube 64 also serves as a water safety line in that in the event of a power failure, or during the initial set-up of the apparatus 20, water may be discharged out of air conducting tube 64. Accordingly, air intake end 66 is, in the preferred embodiment, located over the body of water 26 (best shown in FIG. 1).

In turning to address FIG. 4, directional arrow 56 shows hollow sleeve 46 slidably engaged with cylindrical housing 38 such that sleeve 46 lies almost completely within cylindrical housing 38. Thus, it should be understood that the position of air discharge end 68 of air conducting tube 64 may be varied by axial movement relative to a variable diameter throat means 74. It is also contemplated that a venturi-type tube may be used. In FIG. 4, air discharge port 68 is now found positioned at or within variable diameter throat means 74. At air discharge port 68, the velocity of the water flow will be increased as the water flows through a narrower opening. As discussed, this increase in water velocity increases the amount of ambient air aspirated into the system.

From the air discharge port 68, the air-water mixture is delivered to the body of water 26 in the aquarium tank 22. The air-water mixture travels through a delivery tube 76 which is attached to variable diameter throat means 74 (as best shown in FIG. 1). As shown in FIG. 1, delivery tube 76 feeds to a volcano 75 after passing under gravel, rocks, sand, or etc., at the bottom of the aquarium 22. It should be understood that delivery tube 76 may be split into a multiple of lines to create special effects in the aquarium 22 or to airate the body of water 26.

Referring now to FIGS. 5 and 6, an alternative exemplary embodiment of an air delivery system, in accordance with the present invention, is illustrated. The components of the air delivery system of FIGS. 5 and 6 that are the same components as those heretofore described with regard to FIGS. 1 through 4 are generally indicated having the same reference numerals.

In this alternative embodiment, the apparatus 20 is combined with a pump 130 that delivers water to the apparatus 20. The delivery tube 76 delivers the air-water mixture from the variable diameter throat means 74 to a container 78. Directional arrow 80 (as shown in FIG. 6) shows the path taken by the air-water mixture when it is delivered into the container 78.

Addressing FIG. 6 in greater detail, FIG. 6 is a partial cross-sectional view of the container 78. As shown in the alternative exemplary embodiment, container 78 is vertically disposed. When the air-water mixture enters the container 78, the air, being lighter fills the uppermost portion 82 of container 78. The water from the air-water mixture collects in the lower portion 84 of container 78, and is displaced by the upper mass of air through tube 85. This displacement is shown by directional arrow 87. The air of uppermost chamber 82 may then be delivered out of the system (as shown by directional arrow 86) through an air line 88. A check valve 90 is provided between container 78 and air line 88. Check valve 90 prevents any water from exiting container 78 and entering air line 88.

Referring briefly back to FIG. 5, air line 88 may be used by a diver (generally indicated at 92) using a mouthpiece 94 connected to the end of air line 88. The diver 92 may stay submerged for hours at a time and breath the ambient air delivered from container 78. Because the apparatus 20 delivers aspirated ambient air into the container, there are no compressor oils or other mechanical impurities to pollute the air.

The terms "air" and "ambient air" and "water" have been used in the above designation of the invention for the purpose of delivering an air-water mixture to an aquarium tank. It should be understood that the terms "air" and "ambient air" are not contemplated to be limited to ambient air and may include any gas. Similarly, the word "water" should be interpreted to include any liquids and the invention is not limited to the delivery of aspirated air and water to an aquarium or other body of water or container.

The advantages of the above-described air delivery apparatus will be readily apparent to those skilled in the art. It should also be apparent to those skilled in the art that various additional objects and advantages have been attained by the within invention and that a variety of modifications, adaptions and equivalent constructions can be made within the scope and spirit of the present invention and all such changes, modifications, adaptions and equivalent constructions coming within the scope of the appended claims are embraced thereby.

I claim:

1. In an apparatus for delivering an air-water mixture to a body of water in a container and including a water pump and tube means for conducting water from the pump to the container; the combination of:
   (a) an air delivery means provided in the path of water in said tube means and comprising:
      (i) a cylindrical housing having a longitudinal axis;
      (ii) an elongated open ended hollow sleeve slidable within said housing along said axis;
   (b) locking means for locking said sleeve in a selected location within said cylindrical housing;
   (c) connecting means for connecting one end of said hollow sleeve to said tube means;
   (d) an air conducting tube carried by said connecting means within said delivery means and extending along said axis to an air discharge port;
   (e) a variable diameter throat means connected to one end of said housing and spaced downstream from said air discharge port whereby the amount of air introduced to said water may be varied by axial movement of the sleeve to vary the distance between said throat means and said air discharge port.

2. An apparatus as claimed in claim 1, wherein said container is an aquarium tank and said air conducting tube has an end located above the surface of the water in the tank for the introduction of ambient air.

3. An apparatus as claimed in claim 1 wherein said container has a vertically disposed chamber and is submerged in a body of water and air conducted to said container is collectible in the upper portion of said chamber, said collected air being under pressure and displacing water from the upper portion of said chamber in accordance with the air pressure.

4. An adjustable air delivery means for introducing a selected amount of aspirated air into a stream of water, said air being conducted in an air conducting tube having one end open to the atmosphere, comprising:
   (a) water tube means having a first and second portion, a variable diameter throat and an axis;
   (b) outlet means for discharging air from said air conducting tube into said water stream within said tube means in variable spaced relation to said throat;
   (c) adjustment means for adjusting said spaced relation comprising first and second telescopically related water conducting hollow open ended members;
   (d) a connector means positioned between one end of said first member and said first portion of said water tube means whereby movement of said first member with respect to said second member relative to said throat varies the space between said throat and said air outlet means thereby varying the water flow area and amount of aspirated air.

5. An adjustable air delivery means as claimed in claim 4 wherein said air conducting tube is carried by said connector means, is disposed axially with respect to said first and second telescopically related members, and is supported at its outlet means by the flow of water through said telescopically related water conducting members.

* * * * *